(12) United States Patent
Tomoike

(10) Patent No.: US 6,233,447 B1
(45) Date of Patent: May 15, 2001

(54) MOBILE COMMUNICATION SYSTEM AND A METHOD OF INCOMING CALL RESTRICTION

(75) Inventor: Hiroyuki Tomoike, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/124,073

(22) Filed: Jul. 29, 1998

(30) Foreign Application Priority Data

Aug. 8, 1997 (JP) .................................................. 9-214596

(51) Int. Cl.$^7$ ........................................................ H04B 7/00
(52) U.S. Cl. ............................ 455/411; 455/435; 455/445
(58) Field of Search ..................................... 455/423, 424, 455/422, 410, 411, 426, 432, 433, 435, 445

(56) References Cited

U.S. PATENT DOCUMENTS 6,085,084 * 7/2000 Christmas .............................. 455/411

FOREIGN PATENT DOCUMENTS 3-42950 2/1991 (JP).

* cited by examiner

Primary Examiner—Thanh Cong Le
(74) Attorney, Agent, or Firm—McGuireWoods LLP

(57) ABSTRACT

A mobile communication system which can restrict incoming calls to a mobile communication exchange in a traffic congestion state and can omit wasteful processing for connecting a path to a restricting exchange is provide. When a exchange has detected that it is the traffic congestion state, the exchange instruct this state to a location register to indicate that incoming calls to that exchange are to be restricted. When other exchange has received a call request to a mobile station, the exchange acquires information to the location register for the call. When it is found that the location information of the mobile station is the area which is controlled by the incoming call restricting exchange, a call processing for the call is interrupted.

6 Claims, 3 Drawing Sheets

MOBILE COMMUNICATION SYSTEM AND A METHOD OF INCOMING CALL RESTRICTION

BACKGROUND OF THE INVENTION

1. Field of the Invention

The present invention relates to a mobile communication system, particularly relates to a mobile communication system and a method for restricting incoming calls when a particular mobile communication exchange is under traffic congestion state.

2. Description of the Related Art

A block diagram of constitution of a general mobile communication system focusing to a network side is shown in FIG. 3.

A location register 31, which manages location information and subscriber information of each mobile station 34, is respectively connected to mobile communication exchanges 32 and 33 for call connecting processing via a common channel signaling network 35 and information required for the processing of an incoming call to each mobile station 34 is mutually communicated via the common channel signaling network 35. Although radio base stations and radio base station control units are not shown in drawings, it is assumed that they are part of the mobile communication exchange 32, 33.

In this type of mobile communication system, if the traffic of a specific mobile communication exchange has increased and congestion state occurs, the specific mobile communication exchange is relieved from such a congestion state by restricting an incoming call to the above mobile communication exchange from other mobile communication exchanges and restricting or denying a call origination request from mobile stations under control of the mobile communication exchange through radio base stations (not shown).

FIG. 4 is a sequence diagram showing a conventional type incoming call control method.

Suppose that the mobile communication exchange 33 which controls the mobile station 34 is in a state of congestion.

At this time, when one of the mobile communication exchanges of the mobile communication network, e.g. the mobile communication exchange 32, receives a request 40 for call termination to the mobile station 34, which is under control of the mobile communication exchange 33, the mobile communication exchange 32 sends an incoming call information reading request 41 to the location register 31 through the common channel signaling network 35.

The mobile communication exchange 32 acquires the location information of the mobile station 34 based upon an incoming call information reading response 42 returned from the location register 31 in response to the above request.

The mobile communication exchange 32 recognizes that the mobile station 34 is located in area under control of the mobile communication exchange 33, and sends a request for call termination 43 to the mobile communication exchange 33.

On the other hand, the mobile communication exchange 33 receives the request 43 for call termination to the mobile station 34, however, as the mobile communication exchange 33 itself is in a state of congestion, the mobile communication exchange 33 returns an incoming call denying signal 44 to the mobile communication exchange 32. Hereby, processing for the call in the mobile communication exchange 32 is interrupted, and the call is treated as a call loss.

However, in such a conventional type mobile communication system, as processing for an incoming call to a mobile station located in an area under control of a mobile communication exchange, which is in a state of congestion, is advanced up to the mobile communication exchange, and the incoming call request is denied by the mobile communication exchange. That is, the mobile communication exchange in a state of congestion is required to execute processing for denying the incoming call. Therefore, such processing for rejecting the incoming call by the mobile communication exchange in a state of congestion causes a problem that a mobile communication exchange in a state of congestion is prevented from recovering from the congestion.

To solve the above problem, Japanese Patent Publication Laid-open No. Hei 3-42950 discloses a technology that incoming calls to an exchange in a state of congestion are rejected at an exchange of the preceding stage which is notified by the exchange in a state of congestion that the exchange is currently being in a state of congestion. Hereby, as incoming calls to an exchange in a state of congestion are restricted at the preceding exchange, the above problem can be solved, however, there is a problem that wasteful processing for incoming calls routed up to the preceding exchange cannot be reduced.

SUMMARY OF THE INVENTION

The present invention is made to solve such problems and therefore has an object to provide a mobile communication system which can restrict incoming calls to an exchange in a state of congestion and can omit wasteful processing for connecting to a restricting exchange.

To achieve such an object, a mobile communication system according to the present invention is constituted so that a location register stores incoming call restricting exchange information showing a mobile communication exchange which is under incoming call restricting state; and a mobile communication exchange, when received a call request, acquires a mobile station information including location information and incoming call restricting exchange information to the location register for the received call request, and verifying whether the call terminating process being allowed or not in accordance with the query result.

In more detail, the location register according to the present invention comprises an incoming call restricting exchange information storage section for storing an exchange information showing a mobile communication exchange is under incoming call restricting state due to traffic over load condition or like, and the mobile communication exchange comprises an incoming call judging section for judging whether a call to a mobile station is allowed or not by referring to information including location information of the mobile station and incoming call restricting exchange information obtained from the location register.

Therefore, each mobile communication exchange comprises means for detecting traffic state of own exchange and instructing the traffic congestion state to the location register, and means for judging whether a call to a mobile station is allowed or not according to information obtained from the location register when a call request has been received, and means for interrupting call processing in accordance with a result of judgement which has judged that the mobile station was located in a control area of the mobile communication exchange indicated by the incoming call restricting exchange information.

A method of incoming call restriction for a mobile communication system according to the present invention comprises the following steps;

(1) instructing the location register to store an incoming call restricting exchange information when traffic state of a mobile communication exchange exceeding a predetermined value for rejecting incoming calls to mobile stations located in own control area:

(2) storing the incoming call restricting exchange information in the location register showing that a mobile communication exchange is under incoming call restricting state;

(3) acquiring information to the location register when a mobile communication exchange has received a call request to a mobile station;

(4) judging whether a call to the mobile station is allowed or not according to information from the location register including location information of the mobile station and incoming call restricting exchange information; and (5) interrupting call processing when it has judged the mobile station is locating in a control area of the mobile communication exchange indicated by the incoming call restricting exchange information.

DETAILED DESCRIPTION OF THE PREFERRED EMBODIMENT

Figure 1:
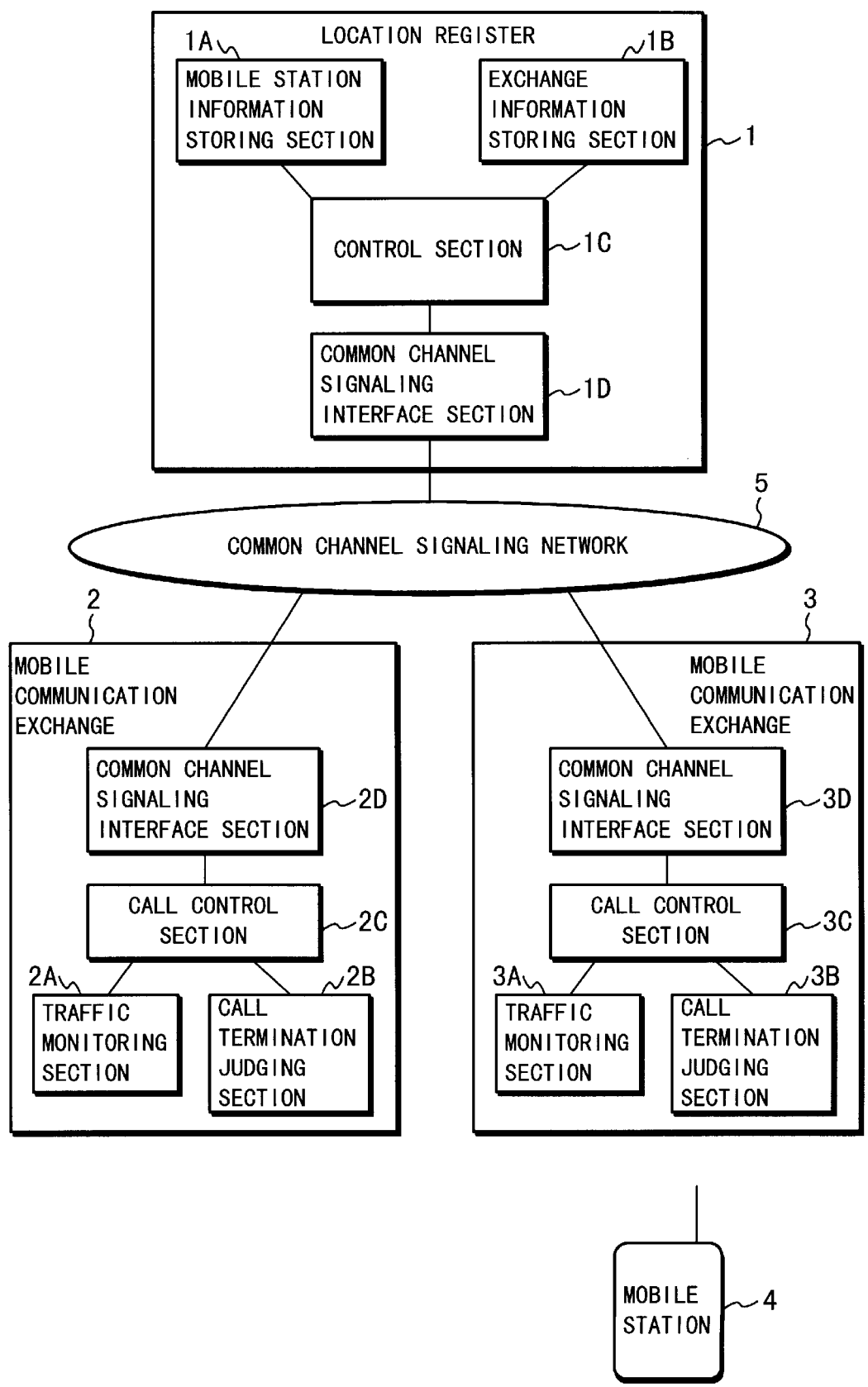
FIG. 1 is a block diagram showing a mobile communication system equivalent to an embodiment of the present invention.

Next, referring to the drawings, the present invention will be described.

FIG. 1 is a block diagram showing a mobile communication system equivalent to an embodiment of the present invention.

The location information and subscriber information of each mobile station 4 are managed by a location register (LR) 1.

The location register 1 is connected to mobile communication exchanges 2 and 3 for executing call connecting processing via a common channel signaling network 5 and information required for the processing of an incoming call to the mobile station 4 is mutually communicated via the common channel signaling network 5.

Although radio base stations and radio base station control units are not shown in drawings, it is assumed that they are part of the mobile communication exchange 2, 3.

The location register 1 is provided with a mobile station information storing section 1A for storing the location information of each mobile station 4, an exchange information storing section 1B for storing exchange information which is restricting incoming calls due to traffic congestion or some other reasons, a control section 1C for executing response processing for a request to acquire mobile station information from the mobile communication exchange, for example, a request to acquire information such as the location information and subscriber information of the mobile station 4, and a common channel signaling interface (I/F) section 1D for providing an interface with the common channel signaling network 5.

The mobile communication exchanges 2 and 3 are respectively provided with call control sections 2C and 3C for executing call connecting processing, common channel signal interface (I/F) sections 2D and 3D for providing an interface with the common channel signaling network 5, traffic monitoring sections 2A and 3A for monitoring the quantity of their own traffic (traffic intensity), and call termination judging sections 2B and 3B for judging the interruption or the continuation of call processing based upon exchange information under incoming call restriction acquired from the location register 1.

Figure 2:
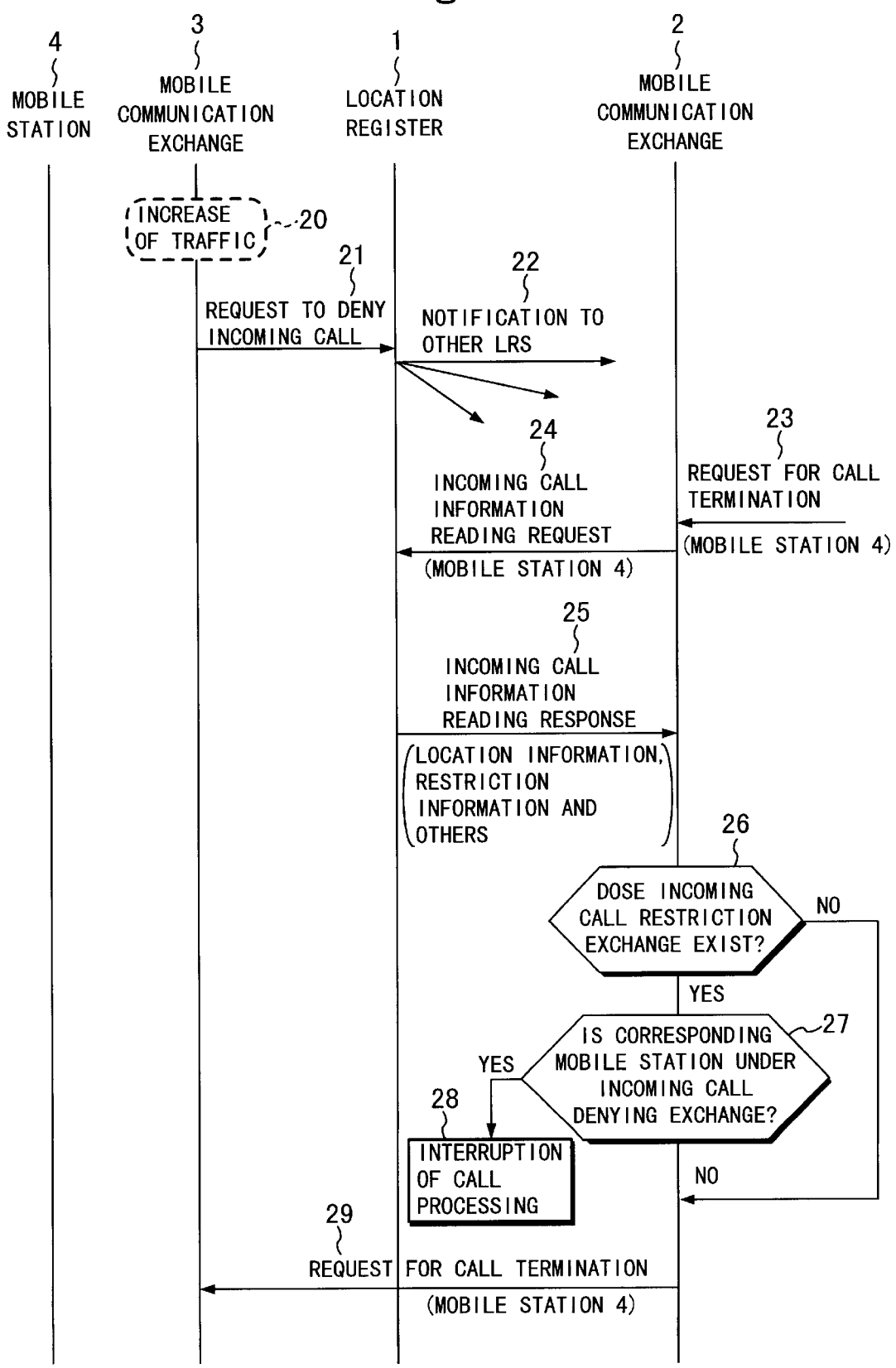
FIG. 2 is a sequence diagram showing incoming call control processing according to the present invention.
Figure 3:
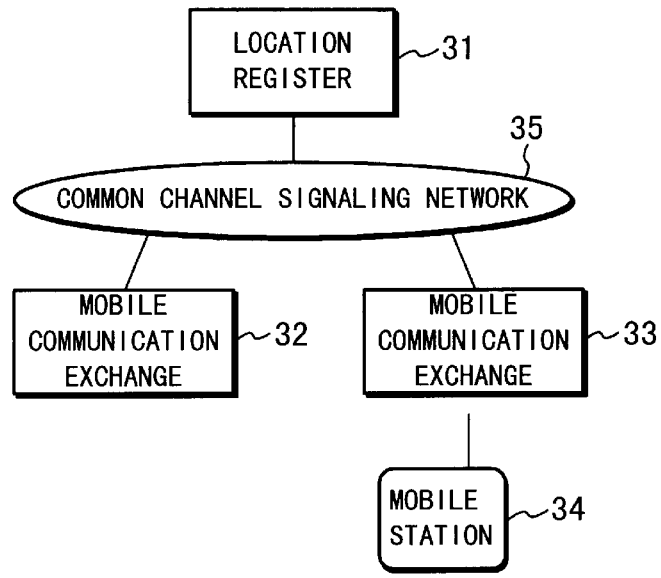
FIG. 3 is a block diagram showing a general mobile communication system.
Figure 4:
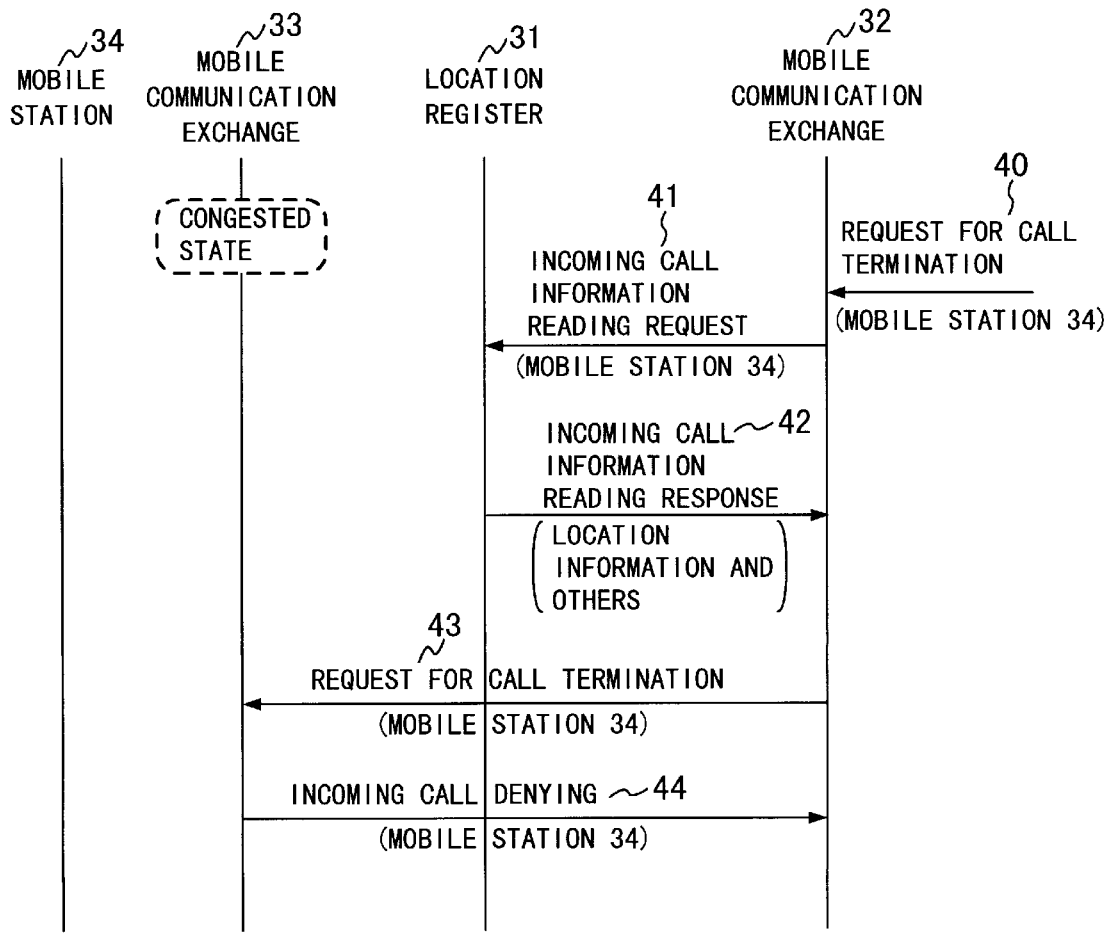
FIG. 4 is a sequence diagram showing a conventional type incoming call control processing.

Next, referring to FIG. 2, the operation according to the present invention will be descried.

FIG. 2 is a sequence diagram showing an incoming call control method according to the present invention.

The traffic monitoring sections 2A and 3A of the mobile communication exchanges 2 and 3 always monitor the quantity of their own traffic. If the increase 20 of traffic occurs in the mobile communication exchange 3 and the quantity of traffic exceeds a predetermined threshold, the traffic monitoring section 3A notifies the call control section 3C of the situation of traffic and instructs the restriction of incoming call from other mobile communication exchanges and requests of call origination from mobile stations in the own control area. The call control section 3C sends a request to deny incoming call 21 to the location register 1 via the common channel signaling interface (I/F) section 3D and the common channel signaling network 5 if the call control section 3c judges, based upon the notification from the traffic monitoring section 3A, that the restriction of incoming calls is required. When a plurality of location registers are provided in the mobile communication network, the request to deny incoming call 21 is sent to all those location registers.

The request to deny incoming call 21 from the mobile communication exchange 3 is received by the common channel signaling (I/F) section 1D of the location register 1 and notified to the control section 1C. The control section 1C stores information that the mobile communication exchange 3 is restricting incoming calls in the exchange information storing section 1B based upon the notified request to deny incoming call 21.

Afterward, if a request for call termination 23 to a mobile station 4, which is located-in the control area of the mobile communication exchange 3, is received by the mobile communication exchange 2, the call control section 2C of the mobile communication exchange 2 sends an incoming call information reading request 24 including the mobile station identification number of the mobile station 4 to the location register 1 to obtain the location information of the mobile station 4.

The location register 1, which has received the incoming call information reading request 24, returns an incoming call information reading response 25 to the mobile communication exchange 2 as a response on the basis of information stored in the mobile station information storing section 1A and the exchange information storing section 1B. Therefore, the location information of the mobile station 4, and also information of exchanges which are under incoming call restriction are included in the incoming call information reading response 25.

The call termination judging section 2B of the mobile communication exchange 2, which has received the incoming call information reading response 25, analyzes an incoming call based upon the location information of the mobile station 4 and incoming call restriction exchange information whether the incoming call is to be processed or interrupted.

First, a judgement 26 is made as to whether any of exchanges under incoming call restriction exist or not.

As the mobile communication exchange 3 is restricting incoming call ("YES" in the judgment 26), next, a judgement 27 is made as to whether the mobile station, to which the incoming call is supposed to be terminated, is located in the control area of the incoming call restriction exchange or not.

In this case, as the mobile station 4 is located in the control area of the mobile communication exchange 3 which is currently restricting incoming calls ("YES" in the judgment 27), it has judged that call connecting processing cannot be continued, and notification thereof is made to the call control section 2C. In response, the call control section 2C decides not to send a request for call termination to the mobile communication exchange 3 and carries out interruption 28 of processing for the incoming call to the mobile station 4.

Therefore, as the request for call termination is not sent to the mobile communication exchange 3 under state of congestion, the load of wasteful processing caused by a request for call termination in the mobile communication exchange 3 can be prevented from being increased and delay in the recovery from congestion can be reduced.

If the mobile station 4 is not located in the control area of the mobile communication exchange 3 of incoming call restriction in the judgment 27 ("NO" in the judgment 27) and if no mobile communication exchange which is restricting incoming calls exists in the judgment 26 ("No" in the judgment 26), the call termination judging section 2B judges that call control processing can be continued. Hereby, the call control section 2C sends a request for call termination 29 to the mobile communication exchange 3 under which a mobile station 4 exists.

As described above, according to the present invention, as information of mobile communication exchange which is restricting incoming calls is stored in a location register which is managing the location information of each mobile station, and is notified to a mobile communication exchange which has inquired information for a mobile station to which an incoming call is to be terminated, the incoming call to the mobile communication exchange in a state of congestion can be rejected at the mobile communication exchange which has firstly received a request for the call.

Therefore, the increase of the load of wasteful processing for a mobile communication exchange in a state of congestion can be avoided, delay in the recovery from a congested state can be reduced and the resources of the whole mobile communication network can be efficiently utilized.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A mobile communication system provided with at least one location register for managing mobile station information such as location information of each mobile station and subscriber information and a plurality of mobile communication exchanges for executing call connection processing by mutually communicating mobile station information with said location register via a common channel signaling network, wherein:

said location register comprising an incoming call restricting exchange information storage section for storing an exchange information showing a mobile communication exchange being under incoming call restricting state; and said mobile communication exchange comprising a call processing section for acquiring a mobile station information including location information and incoming call restricting exchange information from said location register for a call being processed, and interrupting a call processing of said mobile communication exchange under incoming call restricting state based on said mobile station information and incoming call restricting exchange information.

2. A mobile communication system provided with at least one location register for managing mobile station information such as location information of each mobile station and subscriber information and a plurality of mobile communication exchanges for executing call connecting processing by mutually communicating mobile station information with said location register via a common channel signaling network, wherein:

said location register comprising an incoming call restricting exchange information storage section for storing an exchange information showing a mobile communication exchange being under incoming call restricting state; and said mobile communication exchange comprising a traffic monitoring section for monitoring traffic state of own mobile communication exchange and instructing said location register to store the incoming call restricting exchange information when traffic state exceeding a predetermined value for rejecting incoming calls to mobile stations located in own control area, and an incoming call judging section for interrupting a call processing of said mobile communication exchange under incoming call restricting state based on said mobile station information and incoming call restricting exchange information from said location register.

3. A mobile communication system according to claim 2, wherein; said incoming call judging section judging a call process to be denied when the mobile station being located in a control area of the mobile communication exchange indicated by the incoming call restricting exchange information.

4. A mobile communication system comprising:

at least one location register for managing mobile station information, such as location information of each mobile station and subscriber information, and storing an exchange information showing a mobile communication exchange being under incoming call restricting state;

a plurality of mobile communication exchanges for executing call connecting processing by mutually communicating mobile station information with said location register via a common channel signaling network, and each mobile communication exchange comprising:

a traffic monitoring section for monitoring traffic state of own mobile communication exchange and instructing said location register to store the incoming call restricting exchange information when traffic state exceeding a predetermined value for rejecting incoming calls to mobile stations located in own control area;

an incoming call judging section for interrupting a call processing of said mobile communication exchange under incoming call restricting state based on said mobile station information by acquiring result information including location information of the mobile station and incoming call restricting exchange information from said location register; and a call processing section for interrupting call processing in accordance with a result of judgement of said incoming call judging section which has detected the mobile station being located in a control area of the mobile communication exchange indicated by the incoming call restricting exchange information.

5. A method of incoming call restriction for a mobile communication system provided with at least one location register for managing mobile station information such as location information of each mobile station and subscriber information and a plurality of mobile communication exchanges for executing call connecting processing by mutually communicating mobile station information with said location register via a common channel signaling network, said method comprising steps of:

storing incoming call restricting exchange information in said location register showing a mobile communication exchange which is under incoming call restricting state;

acquiring a mobile station information including location information and incoming call restricting exchange information from said location register when a call request being received; and interrupting a call processing of said mobile communication exchange under incoming call restricting state based on said mobile station information and incoming call restricting state based on said mobile station information and incoming call restricting exchange information.

6. A method of incoming call restriction for a mobile communication system provided with at least one location register for managing mobile station information such as location information of each mobile station and subscriber information and a plurality of mobile communication exchanges for executing call connecting processing by mutually communicating mobile station information with said location register via a common channel signaling network, said method comprising steps of:

instructing said location register to store an incoming call restricting exchange information when traffic state of a mobile communication exchange exceeding a predetermined value for rejecting incoming calls to mobile stations located in own control area;

storing the incoming call restricting exchange information in said location register showing a mobile communication exchange being under incoming call restricting state;

acquiring information to said location register when a mobile communication exchange has received a call request to a mobile station;

judging whether a call to the mobile station being allowed or not by acquiring result information including location information of the mobile station and incoming call restricting exchange information from said location register; and interrupting call processing when it has judged the mobile station being located in a control area of the mobile communication exchange indicated by the incoming call restricting exchange information.

* * * * *